Figure 1:
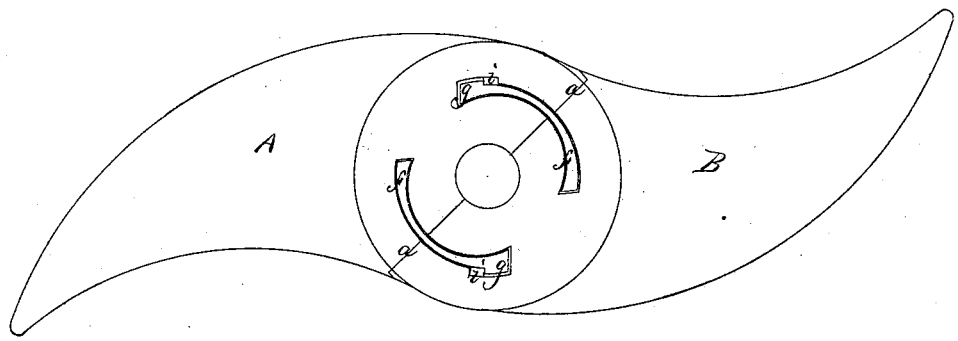
Figure 2:
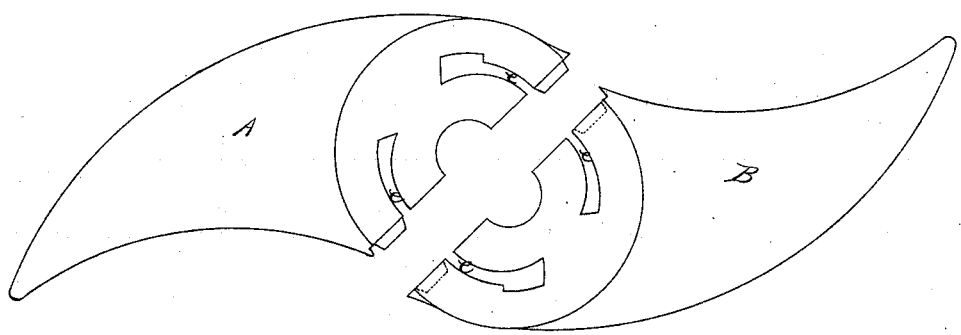
Figure 3:
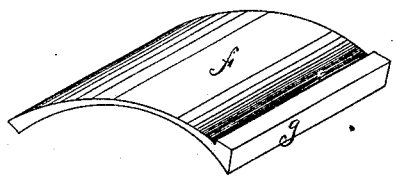

O. P. Hart,
Quartz Mill Cam.

No. 111,643.  Patented Feb. 7, 1871.

Witnesses.
Geo. H. Strong,
J. L. Boone

Inventor.
Oliver P. Hart
by Dewey & Co.
his Attorneys

United States Patent Office.

OLIVER P. HART, OF LOGTOWN, CALIFORNIA.

Letters Patent No. 111,643, dated February 7, 1871.

IMPROVEMENT IN CAMS FOR QUARTZ-MILLS.

The Schedule referred to in these Letters Patent and making part of the same.

*To all whom it may concern:*

Be it known that I, OLIVER P. HART, of Logtown, county of El Dorado, State of California, have invented an Improvement in Cams for Quartz-Mills; and I do hereby declare the following description and accompanying drawing are sufficient to enable any person skilled in the art or science to which it most nearly appertains to make and use my said invention or improvement without further invention or experiment.

My invention relates to an improved manner of uniting or locking together the two sections of a quartz-mill cam, when said cam is constructed in two parts, so as to be readily secured upon or removed from the cam-shaft without displacing or disturbing the shaft or parts of the machinery with which it may be connected.

In order to explain my invention so that others will be able to understand its construction, reference is had to the accompanying drawing forming a part of this specification, in which—

A and B represent two sections of an S-shaped cam, such as is employed for operating the stamps in the ordinary quartz-mill.

The sections A and B are so constructed that when they are locked together the line of division $a$, which separates the two sections of the hub, if extended, would cut the cams just back of their points D, so that the greatest strain upon the joint will be when the pressure is applied at the lower part of the cam near the hub, as the nearer toward the point of the cam the pressure is applied the less the strain upon the joint.

In order to lock the two sections together recesses or ways $e$ are made through the sections of the hub from side to side, and upon each side of the hole through which the shaft passes, in such a manner that when the two sections are united together the two opposite recesses will form one way extending across the line of division $a$.

Each end of these ways is made wider than the middle portion, which crosses the line $a$, and a steel gib, $f$, which is made of a shape corresponding to the shape of the key-way $e$, is forced through the way, thus locking or dovetailing the two sections together.

One or both ends of the gib can be made with a head and shoulder, as shown at $g$, and a key or keys, $i'$, be forced in between it, and a shoulder formed in the way or recess, and thus lock the gib firmly in its way.

The exact form or shape of the key-ways and gibs is not material, as many others perhaps equally effective could be suggested.

Neither is it necessary that the line of division $a$ shall be in a line with the middle of the gibs, as they can be shifted so as to throw the greater portion upon either or alternate sections of the hub.

This manner of uniting the sections of cams, particularly those employed in quartz-crushing mills, will obviate much trouble and expense, as any cam on the cam-shaft, no difference what its location, can be removed and replaced at any time without interrupting any of the adjacent machinery.

The expense of constructing the cams in this manner will be very slight, while their strength will not be materially impaired, as but little strain will come upon the joint.

Having thus described my invention,

What I claim, and desire to secure by Letters Patent, is—

The improved cam herein shown, consisting of the sections A B, respectively provided with key-ways $e$ $e$, in combination with the dovetailed gibs $f$ $g$ and keys $i$ $i$, all constructed and arranged substantially as and for the purpose set forth.

In witness that the above-described invention is claimed by me I have hereunto set my hand and seal.

OLIVER P. HART. [L. S.]

Witnesses:
E. WILLOW,
H. P. OLDS.